United States Patent
Jarand

(10) Patent No.: US 6,517,624 B1
(45) Date of Patent: Feb. 11, 2003

(54) FRICTIONIZING COMPOSITION

(75) Inventor: Mark L. Jarand, Vancouver, WA (US)

(73) Assignee: Kemira Chemicals, Inc., Marietta, GA (US)

( * ) Notice: Subject to any disclaimer, the term of this patent is extended or adjusted under 35 U.S.C. 154(b) by 677 days.

(21) Appl. No.: 08/726,651

(22) Filed: Oct. 7, 1996

Related U.S. Application Data

(63) Continuation of application No. 08/265,449, filed on Jun. 24, 1994, now Pat. No. 5,569,318.

(51) Int. Cl.$^7$ .................................................. C09K 3/14
(52) U.S. Cl. ..................................... 106/36; 106/287.34
(58) Field of Search ............................. 106/36, 287.34, 106/287.17; 252/309, 313.2

(56) References Cited

U.S. PATENT DOCUMENTS

| | | | | |
|---|---|---|---|---|
| 3,860,431 A | * | 1/1975 | Payne et al. | 106/36 |
| 4,452,723 A | * | 6/1984 | Carstens | 106/36 |
| 4,980,024 A | * | 12/1990 | Payne et al. | 106/36 |
| 5,466,493 A | * | 11/1995 | Mefford et al. | 106/36 |

* cited by examiner

Primary Examiner—Michael Marcheschi
(74) Attorney, Agent, or Firm—W. Scott Petty, Esq.; Clark G. Sullivan, Esq.; King & Spalding

(57) ABSTRACT

There is disclosed a frictionizing composition for imparting long-term anti-slip properties to the surface of a paper product comprising an aqueous sol of colloidal silica, glycerin, and at least one agent selected from the group consisting of N-methyl pyrrolidone, N,N-dimethyl acetoacetamide, urea, sorbitol, fructose and dextrose. The composition remains fluid, even after prolonged exposure to drying conditions, and thus is readily dispersible in water for easy cleanup of residue from apparatus and the work environment.

9 Claims, No Drawings

FRICTIONIZING COMPOSITION

This application is a continuation of my application Ser. No. 08/265,449 entitled "Frictionizing Composition" filed Jun. 24, 1994 now U.S. Pat. No. 5,569,318.

BACKGROUND OF THE INVENTION

This invention relates to a composition for imparting anti-slip properties to the surface of a paper product.

During the manufacture of paper bags and boxes the surface of the paper is typically treated with a frictionizing agent to enhance the anti-slip properties of the surface of the finished product. The frictionizing agent increases resistance to slip and thus makes stacks of the finished bags or boxes more stable.

Compositions of colloidal silica are used as frictionizing agents in the paper industry to impart anti-slip properties to cellulose-based paper and fabricated wood products. The compositions are typically applied to a moving web using spray equipment or contact application equipment such as transfer rollers or sponges. Such methods tend to deposit the composition not only on the paper or wood surface as intended, but also as a residue in the immediate work area and on the application equipment. Conventional colloidal silica anti-slip compositions dry to a hard cementitious residue which cannot be redispersed in water. The cementitious residue thus tends to build up on the work area and equipment surfaces, which permits silica chip formation and the formation of silica dust on high speed paper rewind operations. The silica particles contribute to equipment wear, and high levels of silica dust are a health hazard for workers. In addition, since the temperature in the environment of a moving web is typically about 120° F., when conventional colloidal silica compositions are spray-applied, they tend to dry during application and build up on the spray tip, eventually causing the tip to plug.

Various colloidal silica compositions for enhancing surface friction or imparting anti-slip properties to paper surfaces have been disclosed in U.S. Pat. Nos. 4,980,024, 3,860,431, 3,711,416 and 4,452,723. However there is still a need for a frictionizing composition that imparts long-term anti-slip properties to paper surfaces, which is easy to apply, and the residue of which is readily removable.

SUMMARY OF THE INVENTION

The present invention comprises an improved frictionizing composition for imparting anti-slip properties to the surface of paper on which it is applied. The frictionizing composition comprises an aqueous sol of colloidal silica, glycerin and at least one agent selected from the group consisting of N-methyl pyrrolidone (NMP), N,N-dimethyl acetoacetamide (DMAA), urea, sorbitol, fructose and dextrose. Surfaces coated with the frictionizing composition retain their anti-slip properties for an extended period of time. The frictionizing composition remains fluid, or retains the ability to flow, when exposed to drying conditions even for extended periods of time, and remains dispersible in water so that a residue of the composition can easily be removed with water.

DETAILED DESCRIPTION OF THE PREFERRED EMBODIMENT

The composition is prepared in any convenient manner, for example, by mixing together in water the glycerine, and the selected agent or agents, and adding the silica solids to the mixture. The silica solids are preferably added in the form of a sodium-, potassium- or ammonia-stabilized aqueous sol of colloidal silica having a pH between 8 and 10.3, and a particle size between 10 and 150 nanometers. A preferred silica sol is a sodium-stabilized silica sol having a pH between 9 and 10 and a particle size of about 100 nanometers. Such a sol is commercially available as "NYACOL 9950" from Nyacol Products Inc. of Ashland, Mass., which is described as a sodium-stabilized aqueous dispersion of colloidal silica at 50 wt % concentration having a pH of 9.5 and a particle size of 100 nanometers.

The glycerine and other agents are industrial grade or better. A preferred source of NMP is the Arco Chemical Co. of Newtown Square, Pa. An acceptable source of fructose is high fructose corn syrup.

The composition may be diluted up to 80% prior to application by the end user. When the composition is used in hard water environments, tetrasodium EDTA may be added to the composition as a complexing agent for metal ions such as calcium and magnesium. A preferred EDTA complexing agent is "VERSENE 100" available from the Dow Chemical Co. of Midland, Mich., which is preferably added in amounts less than 0.6 wt %. Similarly, a biocide may be added to the composition as a preservative to extend its shelf life. A preferred biocide is "KATHON LX" 1.5% biocide commercially available from Rohm and Haas of Philadelphia, Pa. The complexing agent and the biocide do not affect the frictionizing or fluid viscosity character of the composition.

Representative compositions where the selected agent is sorbitol are set forth below.

|  | Composition (wt %) | | |
| --- | --- | --- | --- |
| Ingredients | 1 | 2 | 3 |
| silica solids | 12 | 20 | 20 |
| glycerin | 10 | 12 | 10 |
| sorbitol | 6 | 5 | 6 |
| tetrasodium EDTA | 0.17 | 0.17 | — |
| biocide | 0.1 | 0.1 | — |
| water | 71.73 | 62.73 | 64 |

Representative compositions where the selected agent is NMP are set forth below.

|  | Composition (wt %) | | | |
| --- | --- | --- | --- | --- |
| Ingredients | 5 | 6 | 7 | 8 |
| silica solids | 20 | 20 | 20 | 20 |
| glycerine | 12 | 16.15 | 15.3 | 13.6 |
| NMP | 5 | .85 | 1.7 | 3.4 |
| water | 63 | 63 | 63 | 63 |

Representative compositions where the selected agent is DMAA are set forth below.

|  | Composition (wt %) | | | | |
| --- | --- | --- | --- | --- | --- |
| Ingredients | 9 | 10 | 11 | 12 | 13 |
| silica solids | 20 | 20 | 20 | 20 | 20 |
| glycerine | 16.5 | 16 | 15.5 | 15 | 14 |
| DMAA | 0.5 | 1 | 1.5 | 2 | 3 |
| water | 63 | 63 | 63 | 63 | 63 |

Representative compositions where the selected agent is urea are set forth below.

| | Composition (wt %) | | | | |
|---|---|---|---|---|---|
| Ingredients | 14 | 15 | 16 | 17 | 18 |
| silica solids | 20 | 20 | 20 | 20 | 20 |
| glycerine | 16 | 15 | 14 | 13 | 12 |
| urea | 1 | 2 | 3 | 4 | 5 |
| water | 63 | 63 | 63 | 63 | 63 |

Representative compositions where the selected ants are sorbitol and NMP are set forth below.

| | Composition (wt %) | | | | | | |
|---|---|---|---|---|---|---|---|
| Ingredients | 19 | 20 | 21 | 22 | 34 | 24 | 25 |
| silica solids | 20 | 20 | 20 | 20 | 20 | 20 | 20 |
| glycerine | 9 | 8 | 7 | 6 | 5 | 8.5 | 6.8 |
| sorbitol | 7 | 7 | 7 | 7 | 7 | 5.5 | 8.5 |
| NMP | 1 | 2 | 3 | 4 | 5 | 3 | 1.7 |
| water | 63 | 63 | 63 | 63 | 63 | 63 | 63 |

Representative compositions having various combinations of two selected agents are set forth below.

| | Composition (wt %) | | |
|---|---|---|---|
| Ingredients | 26 | 27 | 28 |
| silica solids | 20 | 20 | 20 |
| glycerine | 8 | 8 | 7 |
| fructose | 10 | — | 5 |
| NMP | 2 | 2 | — |
| dextrose | — | 10 | — |
| urea | — | — | 6 |
| sorbitol | — | — | 6 |

The frictionizing composition of the present invention imparts anti-slip properties to a paper surface as measured by a slide angle test, and the composition is easily redispersed in water for easy cleanup of any composition deposited as a residue, for example, as over-spray, in the work environment, because the composition has a measurable viscosity even after prolonged exposure to drying conditions. This property contributes to the ability of the frictionizing composition to remain effective in imparting anti-slip properties to the paper surface during the processing of the paper to the finished product.

It is noted that when a colloidal silica composition is applied to a paper surface, it must be sufficiently dry to give a positive result in a standard test for its presence using a lactone dye indicator known in the industry. In other words, a freshly applied, still wet application of a colloidal silica composition will not give a positive result in a standard lactone test for its presence. Although the frictionizing composition of the present invention does not dry to a hard residue on work area surfaces, it does dry on the surface on which it is applied, due to interaction with the surface, to give a positive result in a standard lactone test for its presence.

Slide angle tests were performed to ascertain the effectiveness of the composition of the present invention. The apparatus used was a coefficient of friction angle tester model 32–35, available from Testing Machines, Inc. of Ammityville, N.Y., using the TAPPI method T-815SU-72. The slide angle test is performed by securing to a horizontal support one of a pair of sheets whose surfaces will be tested, with the test surface facing up. The second sheet is placed on the first sheet with the test surface facing down. A weight is placed on the second sheet. The support pivots at a first end as the second end of the support is raised at the prescribed rate. When the weighted sheet begins to slide, the incline angle, or slide angle, is determined. This slide angle is considered to be a measure of the anti-slip properties of the surface of the sheet.

EXAMPLE 1

Composition 1, disclosed above, was diluted one part composition to two parts water and applied by spraying at 30 psi and in a 7"-wide pattern to 42# white liner box blanks traveling on a web at 600 ft/min. The slide angle of the treated surface was measured as noted above. The slide angle of an untreated liner was also measured. The results are presented below in Table 1.

TABLE 1

| | Slide Angle, Average of 3 | |
|---|---|---|
| Composition | Treated | Untreated |
| 1 | 38° | 28° |

EXAMPLE 2

Under the same conditions described above in Example 1, composition 1 was applied to a 42# Kraft liner and the slide angle of the treated surface was measured. The slide angle of an untreated liner was also measured. The results are presented in Table 2.

TABLE 2

| | Slide Angle, Average of 3 | |
|---|---|---|
| Composition | Treated | Untreated |
| 1 | 37° | 20° |

All compositions of the present invention, when similarly applied, provide similar slide angles on the surfaces to which they are applied, and the so-treated surfaces retain their original slide angle values even after undergoing conveyor line processing.

The composition of the present invention retains a measurable viscosity even when exposed to the atmosphere for long periods of time. Because the composition does not solidify, or form a hard, cementitious deposit, it remains readily dispersible in water. The composition is thus easy to apply, and because of its especially fluid nature, little silica-dusting occurs.

The viscosity of the frictionizing composition of the present invention was determined over a period of time by the following test. A 10 ml aliquot of the composition was placed in each of three 50 ml planchettes and allowed to dry at room temperature for periods of one week or 10 days, two weeks or 19 days, and five or six weeks. At the end of each test period the planchettes were tipped at an angle of 30–45° to determine flow characteristics. In all cases, the composition retained a reasonably high degree of flowability, as evidenced by its flow first to the low side of the planchette, then to the other side of the planchette after tipping the planchette 30–45° in the opposite direction. In order to measure relative viscosity, the time required for the composition to flow from the high to the lower side of the planchette was measured, and was designated as "flow time." The measured flow times are set out in Table 3.

TABLE 3

| Composition | Flow Time (in Seconds) | | |
|---|---|---|---|
| | 7 days/10 days | 2 weeks/19 days | 5 weeks/6 weeks |
| 3 | 9 / — | 6 / — | 22 / — |
| 4 | — / 9 | — / 10 | — / 10 |
| 6 | 4 / — | 2 / — | 4 / — |
| 7 | 3 / — | 2 / — | 3 / — |
| 8 | 2.5 / — | 2 / — | 3 / — |
| 9 | — / 2 | — / 3 | — / 3 |
| 10 | — / 1.5 | — / 3 | — / 2 |
| 11 | — / 1.5 | — / 3 | — / 2 |
| 12 | — / 1.5 | — / 2.5 | — / 2 |
| 13 | — / 1.5 | — / 2 | — / 1.5 |
| 14 | — / 2.5 | — / 4 | — / 2 |
| 15 | — / 2 | — / 3 | — / 2 |
| 16 | — / 2 | — / 3 | — / 2 |
| 17 | — / 2 | — / 2.5 | — / 2 |
| 18 | — / 2 | — / 2.5 | — / 2 |
| 19 | — / 6 | — / 11 | — / 12 |
| 20 | — / 6 | — / 10 | — / 19 |
| 21 | — / 8 | — / 14 | — / 28 |
| 22 | — / 6 | — / 10 | — / 32 |
| 23 | — / 6 | — / 11 | — / 45 |
| 24 | — / 4 | — / 10 | — / 26 |
| 25 | 10 / — | 7 / — | 25 / — |
| 26 | 13 / — | 7 / — | 30 / — |
| 27 | 9 / — | 5 / — | 30 / — |
| 28 | 2 / — | 2 / — | 3 / — |

What is claimed is:

1. A frictionizing composition comprising:
   (a) an aqueous sol of colloidal silica;
   (b) glycerin; and
   (c) sorbitol.

2. A frictionizing composition comprising:
   (a) an aqueous sol of colloidal silica;
   (b) glycerin;
   (c) urea; and
   (d) sorbitol.

3. A non-skid surface composition comprising an aqueous suspension of glycerine, colloidal silica and sorbitol, wherein the ratio of colloidal silica to glycerine is about 1.2:1 to 4:1.

4. A method of increasing the coefficient of friction of the surface of a cellulosic substrate comprising the steps of:
   (a) applying a non-skid surface composition comprising an aqueous suspension of glycerine, sorbitol, and colloidal silica, wherein the ratio of said colloidal silica to glycerine is between about 1.2:1 to 4:1, to the surface of said substrate, and
   (b) drying the surface of said substrate.

5. The non-skid surface composition according to claim 3, wherein the ratio is between about 1.2:1 to 2:1.

6. The non-skid surface composition according to claim 3, wherein the colloidal silica has a particle size between 10 and 150 nm.

7. The non-skid surface composition according to claim 3, wherein the colloidal silica is present in an amount of 12–20% by weight of the composition.

8. The non-skid surface composition according to claim 3, wherein the glycerine is present in an amount of 5–10% by weight of the composition.

9. The non-skid surface composition according to claim 3, further comprising fructose or dextrose.

* * * * *